(12) United States Patent
Zhang et al.

(10) Patent No.: US 11,984,098 B2
(45) Date of Patent: May 14, 2024

(54) PER LAYER ADAPTIVE OVER-DRIVE

(71) Applicant: QUALCOMM Incorporated, San Diego, CA (US)

(72) Inventors: Nan Zhang, Beijing (CN); Bo Du, Xi'an (CN); Ya Kong, Beijing (CN); Yongjun Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/546,012

(22) PCT Filed: Apr. 20, 2021

(86) PCT No.: PCT/CN2021/088280
§ 371 (c)(1),
(2) Date: Aug. 10, 2023

(87) PCT Pub. No.: WO2022/222018
PCT Pub. Date: Oct. 27, 2022

(65) Prior Publication Data
US 2024/0127770 A1 Apr. 18, 2024

(51) Int. Cl.
*G09G 5/393* (2006.01)
(52) U.S. Cl.
CPC ....... *G09G 5/393* (2013.01); *G09G 2320/103* (2013.01); *G09G 2320/106* (2013.01); *G09G 2360/18* (2013.01)
(58) Field of Classification Search
CPC .............. G09G 5/393; G09G 2320/103; G09G 2320/106; G09G 2360/18
See application file for complete search history.

(56) References Cited

U.S. PATENT DOCUMENTS

| | | | |
|---|---|---|---|
| 2009/0067509 A1 | 3/2009 | Poon et al. |
| 2009/0295827 A1 | 12/2009 | Mizuno |
| 2019/0371258 A1 | 12/2019 | Morein |
| 2020/0074949 A1 | 3/2020 | Morein |

FOREIGN PATENT DOCUMENTS

CN 104835458 A 8/2015

OTHER PUBLICATIONS

International Search Report and Written Opinion—PCT/CN2021/088280—ISA/EPO—dated Jan. 19, 2022 10 pages.

*Primary Examiner* — Abhishek Sarma
(74) *Attorney, Agent, or Firm* — The Marbury Law Group

(57) ABSTRACT

Embodiments include methods and devices for per layer motion adaptive over-drive strength control for a display panel. Various embodiments may include determining motion information associated with a frame layer, determining an over-drive strength factor for the frame layer based at least in part on the motion information associated with the frame layer, and determining whether the over-drive strength factor is associated with computing a content difference. Various embodiments may include, in response to determining that the over-drive strength factor is associated with computing a content difference, performing fragment shading on the framebuffer object for the frame layer to generate an over-drive compensated framebuffer object for the frame layer based at least in part on the over-drive strength factor, and outputting the over-drive compensated framebuffer object for the frame layer to a default framebuffer for rendering on the display panel.

28 Claims, 9 Drawing Sheets

PER LAYER ADAPTIVE OVER-DRIVE

RELATED APPLICATIONS

This application is the U.S. national stage application for and claims priority to PCT Application No. PCT/CN2021/088280 entitled "PER LAYER ADAPTIVE OVER-DRIVE" that was filed Apr. 20, 2021, the entire contents of which are incorporated herein by reference for all purposes.

BACKGROUND

Long Term Evolution (LTE), Fifth Generation (5G) new radio (NR)(5GNR), and other recently developed communication technologies allow wireless devices to communicate information at data rates (e.g., in terms of Gigabits per second, etc.) that are orders of magnitude greater than what was available just a few years ago. Today's communication networks are also more secure, resilient to multipath fading, allow for lower network traffic latencies, and provide better communication efficiencies (e.g., in terms of bits per second per unit of bandwidth used, etc.). Additionally, improvements in display technologies, such as liquid-crystal display (LCD) panels, organic light-emitting diode (OLED) panels, etc., are supporting wireless devices including display panels having ever higher frame rates (e.g., as measured in frames per second (FPS) or Hertz (Hz)). These and other recent improvements have facilitated the emergence of new ways to deliver to, and experience content on, mobile wireless devices.

SUMMARY

Various aspects include methods and devices for per layer motion adaptive over-drive strength control for a display panel. Various aspects may be performed by a processor of a wireless device. Various aspects may include receiving a draw call for a first frame layer from an application, performing fragment shading on the first frame layer to generate a first framebuffer object for the first frame layer, determining motion information associated with the first frame layer, determining a first over-drive strength factor for the first frame layer based at least in part on the motion information associated with the first frame layer, determining whether the first over-drive strength factor is associated with computing a content difference, and, in response to determining that the first over-drive strength factor is associated with computing a content difference, performing fragment shading on the first framebuffer object for the first frame layer to generate an over-drive compensated framebuffer object for the first frame layer based at least in part on the first over-drive strength factor, and outputting the over-drive compensated framebuffer object for the first frame layer to a default framebuffer for rendering on the display panel.

Various aspects may further include outputting the first framebuffer object for the first frame layer to the default framebuffer for rendering on the display panel in response to determining that the first over-drive strength factor is not associated with computing a content difference.

In some aspects, determining whether the first over-drive strength factor is associated with computing a content difference may include determining whether the first over-drive strength factor is greater than or equal to a strength threshold.

In some aspects, performing fragment shading on the first framebuffer object for the first frame layer to generate an over-drive compensated framebuffer object for the first frame layer based at least in part on the first over-drive strength factor may include determining pixel differences between pixels of the first framebuffer object for the first frame layer and pixels of a prior framebuffer object of a prior frame layer, and performing fragment shading on the first framebuffer object for the first frame layer to generate the over-drive compensated framebuffer object for the first frame layer such that each pixel value of the pixels of the first framebuffer object for the first frame layer increases by a product of that respective pixel's determined pixel difference multiplied by the first over-drive strength factor.

Various aspects may further include receiving a draw call for a second frame layer from the application, performing fragment shading on the second frame layer to generate a second framebuffer object for the second frame layer, determining motion information associated with the second frame layer, determining a second over-drive strength factor for the second frame layer based at least in part on the motion information associated with the second frame layer, determining whether the second over-drive strength factor is associated with computing a content difference, and, in response to determining that the second over-drive strength factor is associated with computing a content difference, determining pixel differences between pixels of the second framebuffer object and pixels of the first framebuffer object, performing fragment shading on the second framebuffer object for the second frame layer to generate the over-drive compensated framebuffer object for the second frame layer such that each pixel value of the pixels of the second framebuffer object for the second frame layer increases by a product of that respective pixel's determined pixel difference multiplied by the second over-drive strength factor, and outputting the over-drive compensated framebuffer object for the second frame layer to the default framebuffer for rendering on the display panel.

In some aspects, the first over-drive strength factor and the second over-drive strength factor may be different values.

In some aspects, the motion information associated with the first frame layer may be a motion speed of a motion vector for the first frame layer.

In some aspects, determining the first over-drive strength factor for the first frame layer based at least in part on the motion information associated with the first frame layer may include determining a match between the motion information associated with the first frame layer and a motion information range in a series of two or more motion information ranges each correlated with an over-drive strength factor, and determining the first over-drive strength factor for the first frame layer as the over-drive strength factor correlated with matching motion information range.

In some aspects, the display panel may be a liquid-crystal display (LCD) panel or an organic light-emitting diode (OLED) panel.

Further aspects may include a wireless device having a processor configured to perform one or more operations of the methods summarized above. Further aspects may include a non-transitory processor-readable storage medium having stored thereon processor-executable instructions configured to cause a processor of a wireless device to perform operations of the methods summarized above. Further aspects include a wireless device having means for performing functions of the methods summarized above. Further aspects include a system on chip for use in a wireless device that includes a processor configured to perform one or more operations of the methods summarized above.

Further aspects include a system in a package that includes two systems on chip for use in a wireless device that includes a processor configured to perform one or more operations of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
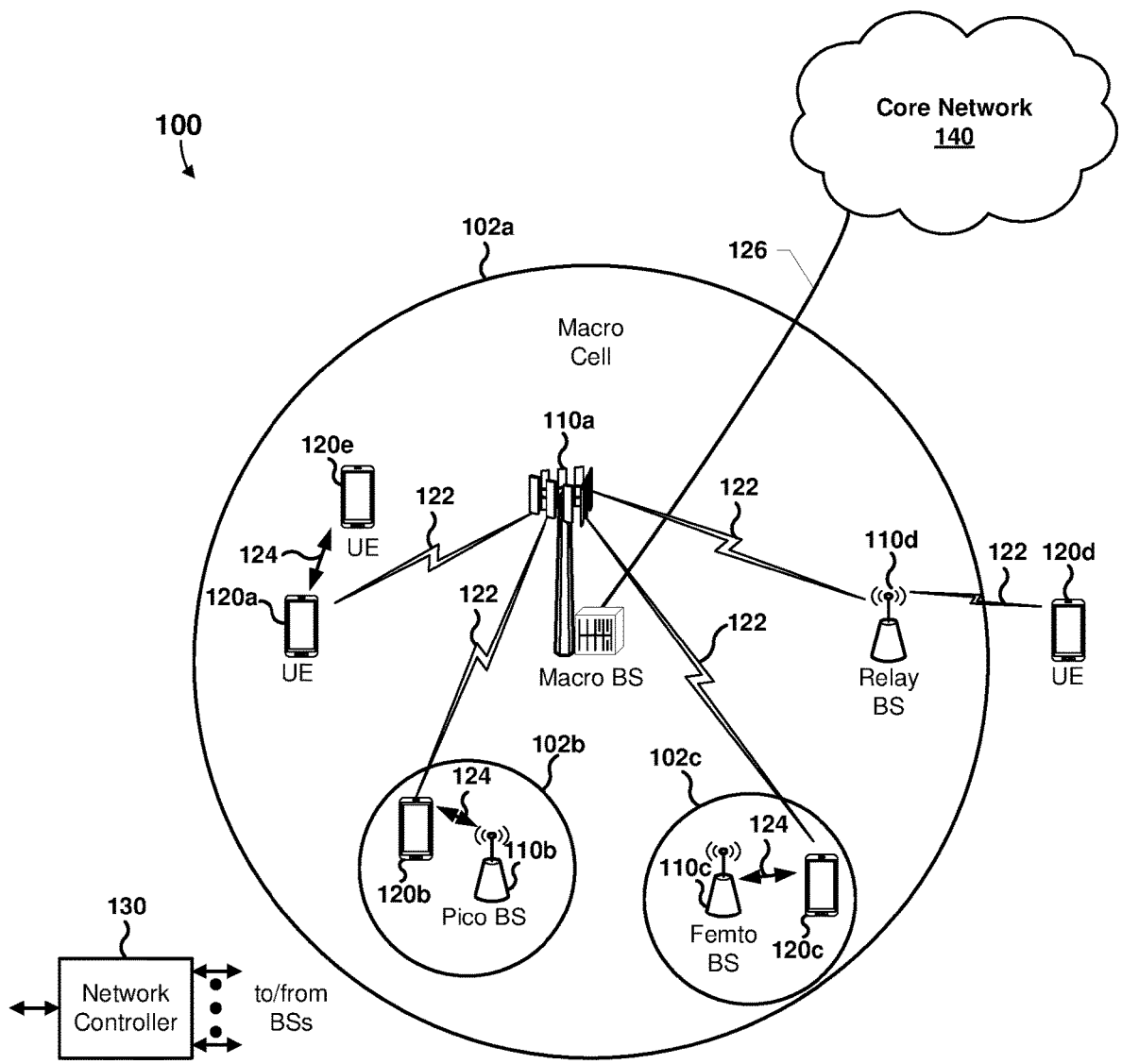
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems, methods, and devices for providing per layer motion adaptive over-drive strength control for a display panel, such as a display panel of a wireless device. Various embodiments may include determining an over-drive strength factor for a frame layer based at least in part on motion information associated with the frame layer, such as a motion speed of a motion vector, etc. In some embodiments, smaller, or even zero value, over-drive strength factors may be associated with motion information indicating small and/or insignificant motion or change is occurring in a frame layer. In some embodiments, little to no over-drive may be applied in scenarios in which a frame layer may not change significantly between sequential frames. Applying little to no over-drive may avoid problems with typical over-drive solutions producing bad visual quality, such as undesired visual artifacts, etc., during scenarios in which line average pixel values may not change significantly between sequential frames, such as during text sliding animations, during the display of simple games without dramatic scene changes, during user interface (UI) animations, etc. Some embodiments may include determining wherein an over-drive strength factor is associated with computing a content difference, such as a difference between pixels of a current frame layer and pixels of a prior frame layer. In various embodiments, in response to determining that the over-drive strength factor is associated with computing a content difference, fragment shading may be performed on a framebuffer object for the frame layer to generate an over-drive compensated framebuffer object for the frame layer based at least in part on the over-drive strength factor. In some embodiments, in response to determining that the over-drive strength factor is not associated with computing a content difference, fragment shading to generate an over-drive compensated framebuffer object may be skipped. Skipping fragment shading to generate an over-drive compensated framebuffer object and/or skipping computing a content difference between frame layers, in scenarios in which the over-drive strength factor is not associated with a content difference, may save power. Such power savings may be achieved because a wireless device process will not expend processing resources in computing a content difference during scenarios in which line average pixel values may not change significantly between sequential frames, such as during text sliding animations, during the display of simple games without dramatic scene changes, during user interface (UI) animations, etc.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palm-top computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. An SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

The terms "network operator," "operator," "mobile network operator," "carrier," and "service provider" are used interchangeably herein to describe a provider of wireless communications services that owns or controls elements to sell and deliver communication services to an end user, and provides necessary provisioning and credentials as policies implemented in user device subscriptions.

As used herein, the term "RF resource" refers to the components in a communication device that send, receive, and decode radio frequency signals. An RF resource typically includes a number of components coupled together that transmit RF signals that are referred to as a "transmit chain," and a number of components coupled together that receive and process RF signals that are referred to as a "receive chain."

LTE is a mobile network standard for 4G wireless communication of high-speed data developed by the 3GPP (3rd Generation Partnership Project) and specified in its Release 8 document series. The 5G system (5GS) is an advanced technology from 4G LTE, and provides a new radio access technology (RAT) through the evolution of the existing mobile communication network structure. Implementations for 5GS networks are currently being adopted that provide new radio (NR) (also referred to as 5G) support via NR base stations, such as Next Generation NodeB (gNodeBs or gNBs)). The 5G systems and NR base stations are providing flexibility in bandwidth scheduling and utilization. Future generation systems (e.g., sixth generation (6G) or higher systems) may provide the same or similar flexibility in bandwidth scheduling and utilization.

While display panels for wireless devices, such as liquid-crystal display (LCD) panels, organic light-emitting diode (OLED) panels, etc., are being manufactured with ever higher frame rates (e.g., as measured in frames per second (FPS) or Hertz (Hz)), such as 120 Hz, 180 Hz, etc., the display panel physical visual response time has not improved. The higher frames rates have resulted in faster back plane electrical charge and de-charge times for display panels, such as LCD panels, OLED panels, etc. However, the physical visual response time of the display panels is not determined solely by the backplane electrical charge and de-charge times. As such, display panels, such as LCD panels, OLED panels, etc., typically implement over-drive to improve the physical visual response time of the display panel.

Over-drive (sometimes also referred to as "overdrive" or simply "OD") is the application of higher voltages to pixels of a display panel, such as an LCD panel, OLED panel, etc., to speed up the pixel transition of the display panel. The speeding up of the pixel transition increases the physical visual response time of the display panel. Applying over-drive may reduce visual artifacts observable by a user of a display panel, such as "ghosting" in which pixel trailing of an image is observable on the display panel, motion blur in which moving images are observed to be blurry by a user, etc. The increase in the voltage to be applied to a pixel of a display panel in an over-drive instance may be the over-drive factor. Higher voltages may be associated with higher over-drive factors and lower voltages may be associated with lower over-drive factors.

In typical display panels, over-drive is implemented by a dedicated display integrated circuit (DDIC). In a typical over-drive solution, a DDIC may store line-average pixel values of a last frame and then apply an over-drive factor per line of the display panel for a next frame using the line-average pixel value for the corresponding line of the last frame. This typical over-drive solution may produce good visual quality for video play-back scenarios. However, this typical over-drive solution may produce bad visual quality, such as undesired visual artifacts, etc., during scenarios in which line average pixel values may not change significantly between sequential frames, such as during text sliding animations, during the display of simple games without dramatic scene changes, during user interface (UI) animations, etc.

Various embodiments include systems, methods, and devices for providing per layer motion adaptive over-drive strength control for a display panel, such as a display panel of a wireless device.

In various embodiments, a processor of a wireless device, such as an application processor, graphics processor unit (GPU), etc., may receive a draw call for a frame layer from an application. A frame layer may be a graphical object associated with an application, such as a window to be displayed on a display panel, a game screen to be displayed on a display panel, an animation of another object (e.g., an animation of text, etc.) to be displayed on a display panel, a user interface (UI) animation to be displayed on a display panel, etc. Draw calls may be indications from an application to elements of a graphics processing pipeline of a wireless device indicating a frame layer to be rendered on a display panel. The graphics processing pipeline may include graphics processing elements, such as fragment shaders, geometry processors, rasterizers, pixel processors, etc., that may operate to output data for rendering, such as framebuffer objects, etc., to the default framebuffer. For example, framebuffer objects may be data structures including pixel values, textures, etc., output to the default framebuffer. A window/view manager may cause data for a frame layer to be rendered on a display panel from the default framebuffer, such as pixel values, to be output to a display driver for rendering on the display panel.

In various embodiments, draw calls for frame layers may be handled differently for fragment shading based on whether the application generating the draw call is associated with over-drive compensation. Some applications, such as video applications, may not be associated with over-drive compensation. Some applications, such as applications in which line average pixel values may not change significantly between sequential frames, (e.g., text sliding animation applications, simple game applications, UI animation applications, etc.), may be associated with over-drive compensation. As one example, a list of applications associated with over-drive compensation may be maintained by a processor of a wireless device, such as an application processor, GPU, etc., and the application generating the draw call may be checked against the list of applications associated with over-drive compensation to determine whether the application is associated with over-drive compensation. Draw calls from applications not associated with over-drive compensation may be handled in a typical manner with fragment shading performed and the output sent to the default framebuffer for rendering on a display panel. In this manner, draw calls for frame layers of applications not associated with over-drive compensation may result in fragment shading for the frame layers being performed without framebuffer objects for the frame layers being stored for use in subsequent fragment shading and/or without over-drive strength factors being computed and/or applied to the frame layers of applications not associated with over-drive compensation.

In various embodiments, a framebuffer object may be created and/or bound to a frame layer in a memory. For example, in response to determining that a draw call for a frame layer is from an application associated with over-drive compensation, a processor of a wireless device, such as an application processor, GPU, etc., may bind a framebuffer object for the frame layer in a memory. In this manner, a memory location for associated with the frame layer may be reserved for the result of fragment shading of the frame layer. In various embodiments, a processor of a wireless device, such as an application processor, GPU, etc., may perform fragment shading on the frame layer to generate a framebuffer object for the frame layer. The fragment shading may generate a framebuffer object for the frame layer including pixel values for the frame layer and other data, such as texture data for the frame layer, etc.

In various embodiments, the motion information for a frame layer may be determined. As one example, the motion information may be a motion speed (e.g., pixels per frame (pixel/frame)) of a motion vector of the frame layer. As another example, the motion information may be a motion vector value itself (e.g., a value indicating a direction, such as top-to-bottom, bottom-to-top, etc., a value indicating there is no motion, such as a zero value, etc.) Motion information may be determined based on frame layer information, such as animation information for a frame layer provided by a window/view manager. In some embodiments, the motion information may be detected and computed per frame layer and different motion information may be determined for different frame layers.

In various embodiments, an over-drive strength factor for a frame layer may be determined based at least in part on motion information associated with the frame layer. In various embodiments, over-drive strength factors may be associated with different motion information. For example, motion information indicating faster motion, such as higher motion speeds, may be associated with stronger (or higher value) over-drive factors and motion information indicating slower motion, such as slower motion speeds, may be associated with weaker (or lower value) over-drive factors. As a specific example, motion speed ranges, such as pixels per frame speeds, may be correlated with over-drive strength factors. A processor of a wireless device, such as an application processor, GPU, etc., may compare the motion speed of the frame layer to the motion speed ranges to determine the over-drive strength factor correlated with the motion speed range in which the motion speed of a frame layer falls. In various embodiments, motion information correlations to over-drive strength factors and/or the over-drive strength factors may be determined in various manners, such as by in-lab tuning, artificial intelligence (AI) training, user settings, etc.

Various embodiments may include determining a content difference between a current frame layer and a prior frame layer. For example, pixel differences between a frame layer "N" and the prior frame layer "N−1" may be determined. In various embodiments, an over-drive strength factor may be associated with computing a content difference. For example, over-drive strength factors may be compared to a strength threshold to determine whether or not to compute a content difference for a current frame. As a specific example, an over-drive strength factor being equal to or greater than a strength factor may indicate the over-drive strength factor is associated with computing a content difference. As another specific example, an over-drive strength factor being greater than a strength factor may indicate the over-drive strength factor is associated with computing a content difference. As another example, an over-drive strength factor being less than a strength factor may indicate the over-drive strength factor is associated with computing a content difference. In various embodiments, in response to determining that an over-drive strength factor is not associated with computing a content difference, a processor of a wireless device, such as an application processor, GPU, etc., may skip computing a content difference between a current frame layer and a prior frame layer. For example, in response to determining that an over-drive strength factor is not associated with computing a content difference, a processor of a wireless device, such as an application processor, GPU, etc., may not determine pixel differences between a frame "N" and the prior frame "N−1". In this manner, in response to determining that an over-drive strength factor is not associated with computing a content difference, a processor of a wireless device, such as an application processor, GPU, etc., may conserve processing resources and save power by not computing a content difference. In response to determining that an over-drive strength factor is not associated with computing a content difference, a framebuffer object for the frame layer may be output to the default framebuffer for rendering on a display panel without over-drive compensation being applied.

Various embodiments may include performing fragment shading on a framebuffer object for a frame layer to generate an over-drive compensated framebuffer object for the frame layer. In some embodiments, in response to determining that an over-drive strength factor is associated with computing a content difference, a processor of a wireless device, such as an application processor, GPU, etc., may perform fragment shading on a framebuffer object for a frame layer to generate an over-drive compensated framebuffer object for the frame layer based at least in part on an over-drive strength factor. In some embodiments, the over-drive strength factor may be used to modify the pixel values of pixels of the frame layer to generate an over-drive compensated framebuffer object for the frame layer. For example, the over-drive strength factor may be added to and/or multiplied by the pixel values to increase the pixel values.

In various embodiments, a processor of a wireless device, such as an application processor, GPU, etc., may perform fragment shading on the framebuffer object for the frame layer to generate an over-drive compensated framebuffer object for the frame layer such that each pixel value of the pixels of the frame buffer object for the frame layer increases by a product of that respective pixel's determined pixel difference multiplied by the over-drive strength factor. As a specific example, pixel differences between a frame layer "N" and the prior frame layer "N−1" may be determined. In various embodiments, framebuffer objects for frame layers may be saved as frame layers are handled for fragment shading.

As the framebuffer objects may be stored in memory per frame layer, framebuffer objects may be compared to one another to determine content changes between frame layers. For example, the framebuffer object of the layer "N" may be compared to the framebuffer object for frame layer "N−1". Using the determined pixel differences, a processor of a wireless device, such as an application processor, GPU, etc., may perform fragment shading on the framebuffer object for the frame layer to generate an over-drive compensated framebuffer object for the frame layer. This fragment shading on framebuffer objects may be performed such that each pixel value of the pixels of the frame buffer object for the frame layer increases by a product of that respective pixel's determined pixel difference multiplied by the over-drive strength factor. For example, for frame layer "N", the pixel (x,y) may have its pixel value (e.g., pixel value (x,y)) set to its original pixel value (e.g., original pixel value (x,y)) in the framebuffer object plus the pixel difference between frame layer N and frame layer N−1 (e.g., pixel diff) multiplied by the over-drive factor of frame layer N (e.g., OD str factor of N) (e.g., pixel value (x,y)=original pixel value (x,y)+(pixel diff*OD str factor of N)). In this manner, dual framebuffer objects for frame layers having over-drive strength factors is associated with computing a content difference may be created, such as the framebuffer object for the frame layer and the over-drive compensated framebuffer object. The framebuffer object for the frame layer may be stored in memory and the over-drive compensated framebuffer may be output to default framebuffer for rendering on a display panel.

As a specific example of an implementation according to various embodiments, a first draw call for a first frame layer (layer 0) from an application associated with over-drive compensation may be received and a framebuffer object (FBO A) may be created for that first frame layer (layer 0). The first frame layer (layer 0) may be determined to have a motion vector of zero and a motion speed of 0 pixels per frame. The motion speed of 0 pixels per frame may be associated with an over-drive strength factor having a zero value. The over-drive strength factor of the first frame layer (layer 0) may be below the strength threshold of one (1). As such, the first frame layer's (layer 0) content difference may not be computed and its framebuffer object (FBO A) may be output to the default framebuffer for rending on a display panel.

Continuing with the specific example, a second draw call for a second frame layer (layer 1) from the application associated with over-drive compensation may be received and a framebuffer object (FBO B) may be created for that second frame layer (layer 1). The second frame layer (layer 1) may be determined to have a motion vector from top-to-bottom and a motion speed of 40 pixels per frame. The motion speed of 40 pixels per frame may be associated with an over-drive strength factor having a 1.2 value. The over-drive strength factor of the second frame layer (layer 1) may be above the strength threshold of one (1) (e.g., 1.2>1). As such, the second frame layer's (layer 1) content difference may be computed. For example, the difference between the pixels of the framebuffer object (FBO B) and the previous frame layer's (layer 0) framebuffer object (FBO A) may computed for each pixel of the second frame layer (layer 1). For each pixel of the second frame layer (layer 1), an over-drive compensated pixel value may be determined by multiplying the pixel value difference for that pixel and the over-drive factor of the second frame layer together and adding the result to the pixel value in the framebuffer object (FBO B) to generate an over-drive compensated framebuffer object (FBO OD-B). In this manner, the pixel values of one or more instances of pixels in the framebuffer object (FBO B) may be increased to generate the over-drive compensated framebuffer object (FBO OD-B). The over-drive compensated framebuffer object (FBO OD-B) may be output to the default framebuffer for rendering on the display panel and the framebuffer object (FBO B) may be stored in a memory. In this manner, dual framebuffer objects (FBO B and FBO OD-B) may be created and used for rendering and over-drive processing of the second frame layer (layer 1).

Continuing with the specific example, a third draw call for a third frame layer (layer 2) from the application associated with over-drive compensation may be received and a framebuffer object (FBO C) may be created for that third frame layer (layer 2). The third frame layer (layer 2) may be determined to have a motion vector from top-to-bottom and a motion speed of 200 pixels per frame. The motion speed of 200 pixels per frame may be associated with an over-drive strength factor having a 2.0 value. As such, the over-drive strength factor for the first frame layer (layer 0), the second frame layer (layer 1), and the third frame layer (layer 2) may be different (e.g., 0, 1.2, 2.0, respectively). The over-drive strength factor of the third frame layer (layer 2) may be above the strength threshold of one (1) (e.g., 2.0>1). As such, the third frame layer's (layer 2) content difference may be computed. For example, the difference between the pixels of the framebuffer object (FBO C) and the previous frame layer's (layer 1) framebuffer object (FBO B) may be computed for each pixel of the third frame layer (layer 2). For each pixel of the third frame layer (layer 2), an over-drive compensated pixel value may be determined by multiplying the pixel value difference for that pixel and the over-drive factor of the third frame layer together and adding the result to the pixel value in the framebuffer object (FBO C) to generate an over-drive compensated framebuffer object (FBO OD-C). In this manner, the pixel values of one or more instances of pixels in the framebuffer object (FBO C) may be increased to generate the over-drive compensated framebuffer object (FBO OD-C). The over-drive compensated framebuffer object (FBO OD-C) may be output to the default framebuffer for rendering on the display panel and the framebuffer object (FBO C) may be stored in a memory. In this manner, dual framebuffer objects (FBO C and FBO OD-C) may be created and used for rendering and over-drive processing of the third frame layer (layer 2). Additionally, as the over-drive compensation varies with both the pixel difference and the over-drive strength factor for each layer, the over-drive compensated framebuffer object (FBO OD-C) and the over-drive compensated framebuffer object (FBO OD-B) may represent different over-drive compensation levels applied to their respective frame layers on a per frame layer basis.

FIG. 1 is a system block diagram illustrating an example communication system 100 suitable for implementing any of the various embodiments. The communications system 100 may be a 5G New Radio (NR) network, or any other suitable network, such as a Long Term Evolution (LTE) network, 6G or later network, etc.

The communications system 100 may include a heterogeneous network architecture that includes a core network 140 and a variety of mobile devices (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, a user equipment (UE), etc.

A macro base station 110*a* may communicate with the communication network 140 over a wired or wireless communication link 126. The wireless devices 120*a*, 120*b*, 120*c* may communicate with a base station 110*a*-110*d* over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120*a-e* may be included inside a housing that houses components of the wireless device, such as processor components, memory components, similar components, or a combination thereof.

In general, any number of communication systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more mobile devices 120*a-e* (for example, illustrated as the wireless device 120*a* and the wireless device 120*e*) may communicate directly using one or more sidelink channels 124 (for example, without using a base station 110*a*-1110*d* as an intermediary to communicate with one another). For example, the wireless devices 120*a-e* may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120*a-e* may perform scheduling operations, resource selection operations, as well as other operations described elsewhere herein as being performed by the base station 110*a*.

Figure 2:
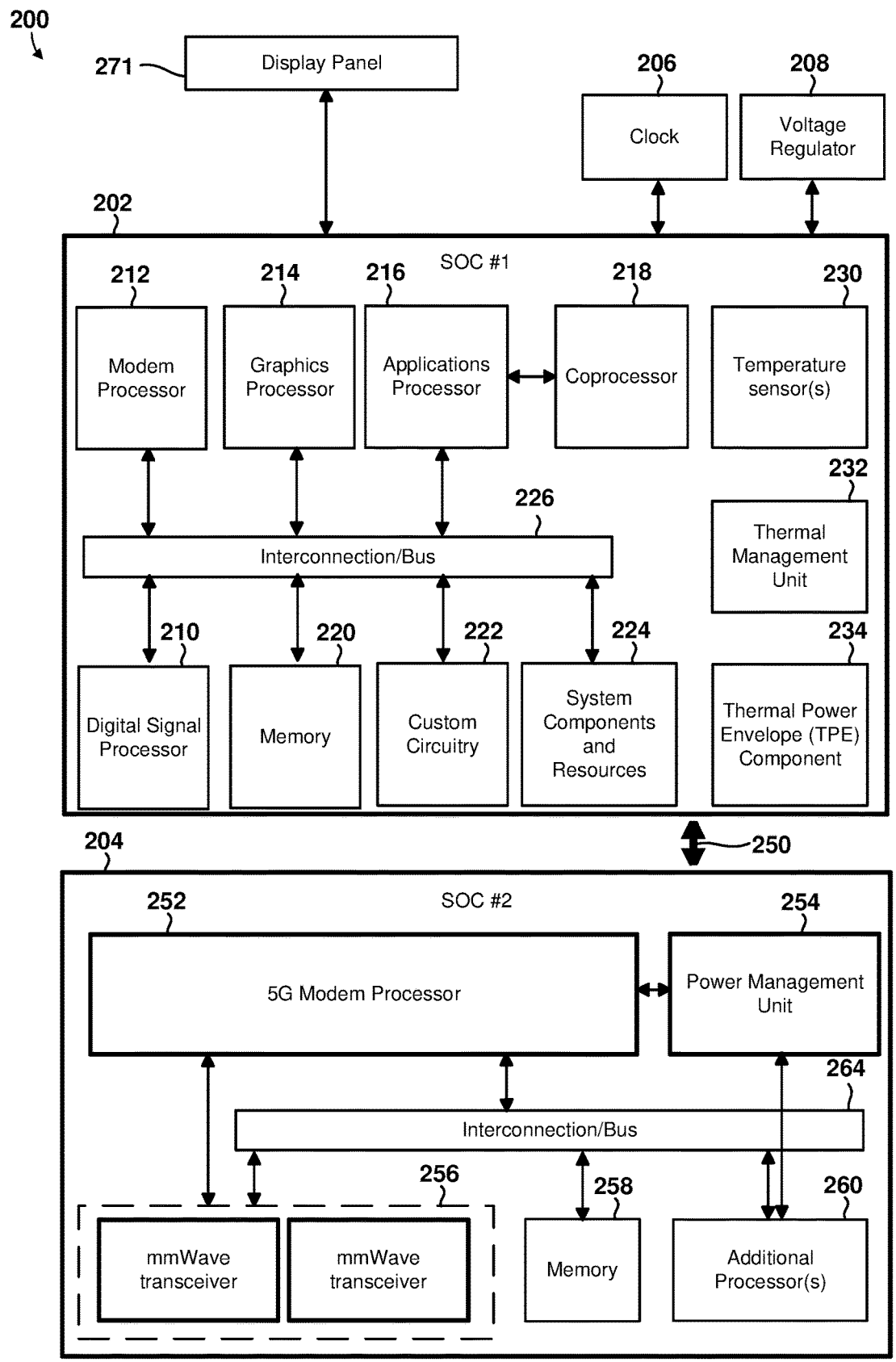
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example wireless device 200 (which may be a SIP in some embodiments) includes a two SOCs 202, 204 coupled to a clock 206, a voltage regulator 208. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays (also referred to as electronic display panels, such as display panel 271), wireless communication devices, external memory chips, etc.

The first and second SOC 202, 204 may communicate via an interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206, a voltage regulator 208, one or more display panels 271, etc. Resources external to the SOC (e.g., clock 206, voltage regulator 208, display panel 271) may be shared by two or more of the internal SOC processors/cores. The display panel 271 may be any type display panel, such as a liquid-crystal display (LCD) panel, organic light-emitting diode (OLED) panel, etc. The display panel 271 may have a higher frame rate (e.g., as measured in frames per second (FPS) or Hertz (Hz)), such as 120 Hz, 180 Hz, etc. The display panel 271 may be configured to render images output from a graphics processing pipeline running on the first and/or second SOCs 202, 204.

In addition to the example SIP 200 discussed above, various embodiments may be implemented in a wide variety of computing systems, which may include a single processor, multiple processors, multicore processors, or any combination thereof.

Figure 3:
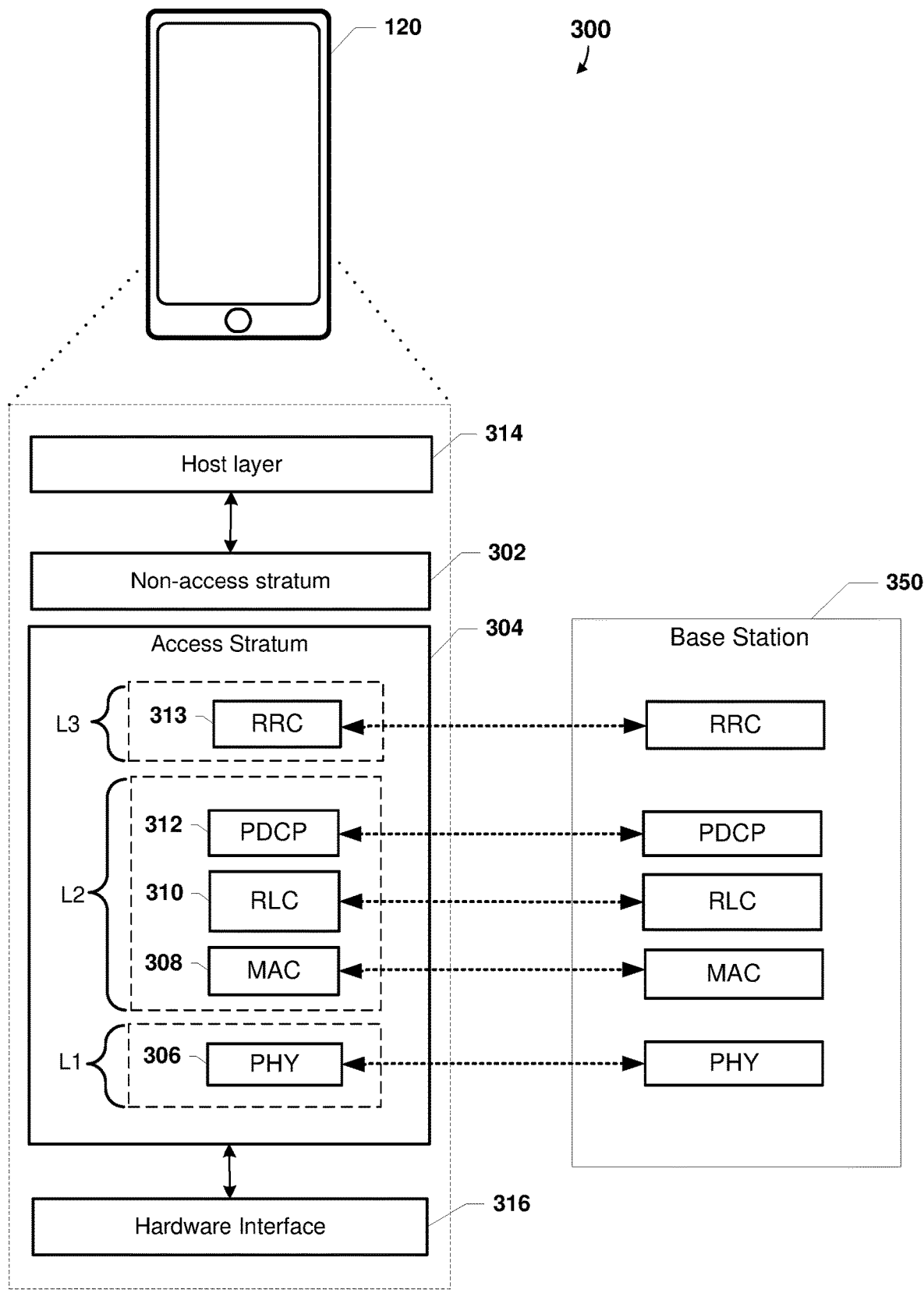
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 120 may implement the software architecture 300 to facilitate communication between a wireless device 120 (e.g., the wireless device 120a-120e, 200) and the base station 350 (e.g., the base station 110a) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 120 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 120 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 120. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
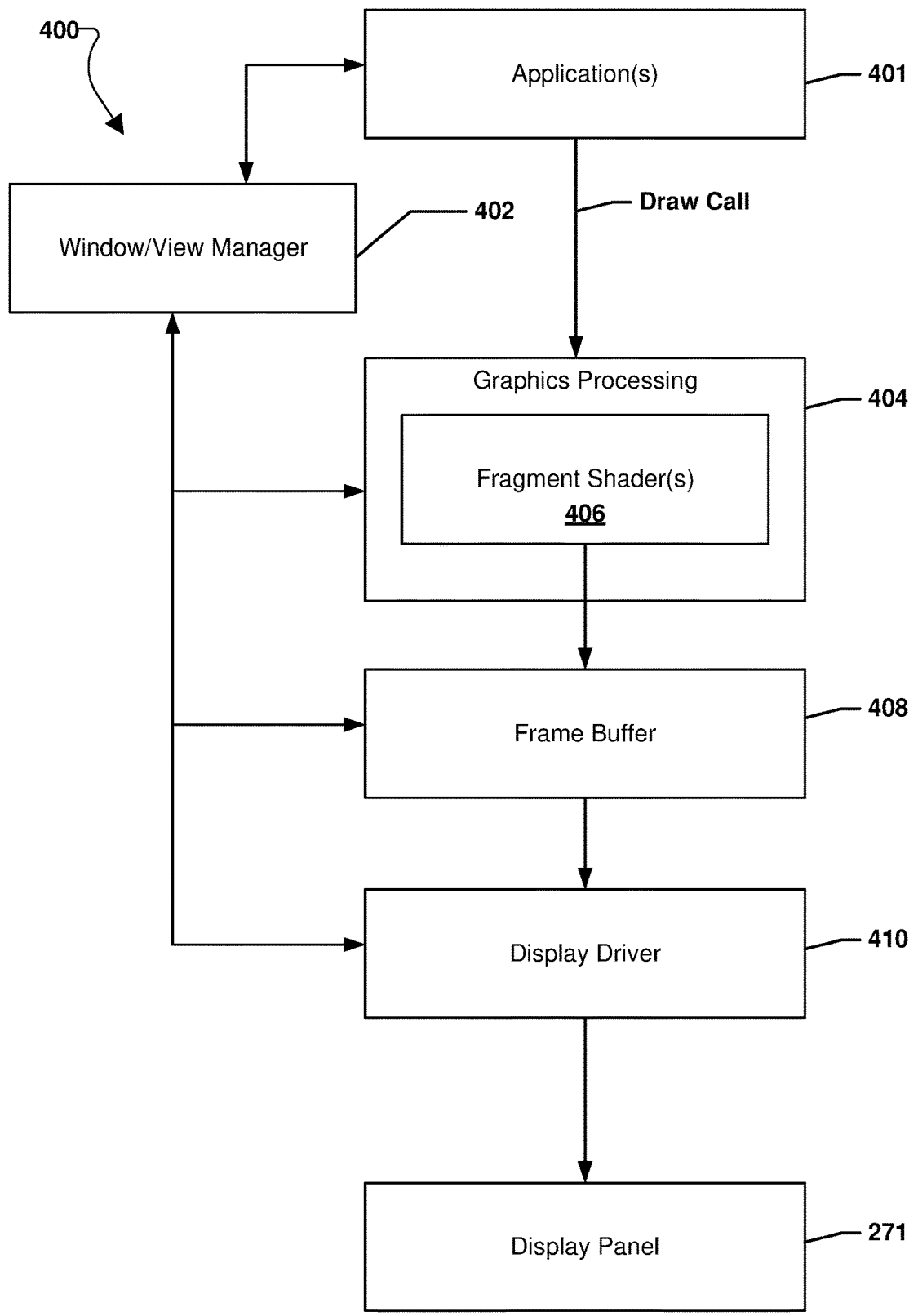
FIG. 4 is a component block diagram illustrating selected portions of an example graphics processing pipeline suitable for implementing any of the various embodiments.

FIG. 4 is a component block diagram illustrating selected portions of an example graphics processing pipeline 400 suitable for implementing any of the various embodiments. With reference to FIGS. 1-4, a processor (e.g., applications processor 216, graphics processor 214, coprocessor 218, etc.) of a wireless device (e.g., the wireless device 120a-120e, 200, 320) including the display panel 271 may implement the graphics processing pipeline 400 to facilitate rendering images on the display panel 271.

In the graphics processing pipeline 400, a window/view manager 402 may interface with applications 401, graphics processing elements 404, such as fragment shader(s) 406, a frame buffer 408, such as a default framebuffer, and a display driver 410, such as a DDIC. The window/view manager 402 may control the operations of the graphics processing elements 404, frame buffer 408, and/or display driver 410 to render images on the display panel 271. Applications 401, such as games, animation applications, video applications, web browsers, etc., may output draw calls to graphics processing elements 404. The draw calls may be draw calls for one or more frame layers, such as windows, images, backgrounds, scrolling text, animations, etc. A frame layer may be a graphical object associated with an application, such as a window to be displayed on the display panel 271, a game screen to be displayed on the display panel 271, an animation of another object (e.g., an animation of text, etc.) to be displayed on the display panel 271, a UI animation to be displayed on the display panel 271, etc. Draw calls may be indications from an application 401 to the graphics processing elements 404, such as the fragment shader 406, indicating a frame layer to be rendered on the display panel 271.

The graphics processing elements 404 may include fragment shaders 406 and other elements, such as geometry processors, rasterizers, pixel processors, etc., that may operate to output date for rendering, such as framebuffer objects, etc., to the frame buffer 408, such as a default framebuffer. For example, framebuffer objects may be data structures including pixel values, textures, etc., output to the frame buffer 408.

The window/view manager 402 may cause data for a frame layer to be rendered on the display panel 271 from the frame buffer 408, such as pixel values, to be output to the display driver 410 for rendering on the display panel 271.

In various embodiments, the fragment shader 406 may apply over-drive compensation for a frame layer on a per frame layer basis. In various embodiments, over-drive compensation applied by a fragment shader 406 may be independent of any over-drive applied by the display driver 410 and/or display panel 271. For example, the over-drive compensation applied by the fragment shader 406 may be in addition to over-drive applied by the display driver 410 and/or display panel 271. As another example, the over-drive compensation applied by the fragment shader 406 may be applied in place of any over-drive applied by the display driver 410 and/or display panel 271 (e.g., the display driver 410 and/or display panel 271 may apply no over-drive).

Figure 5:
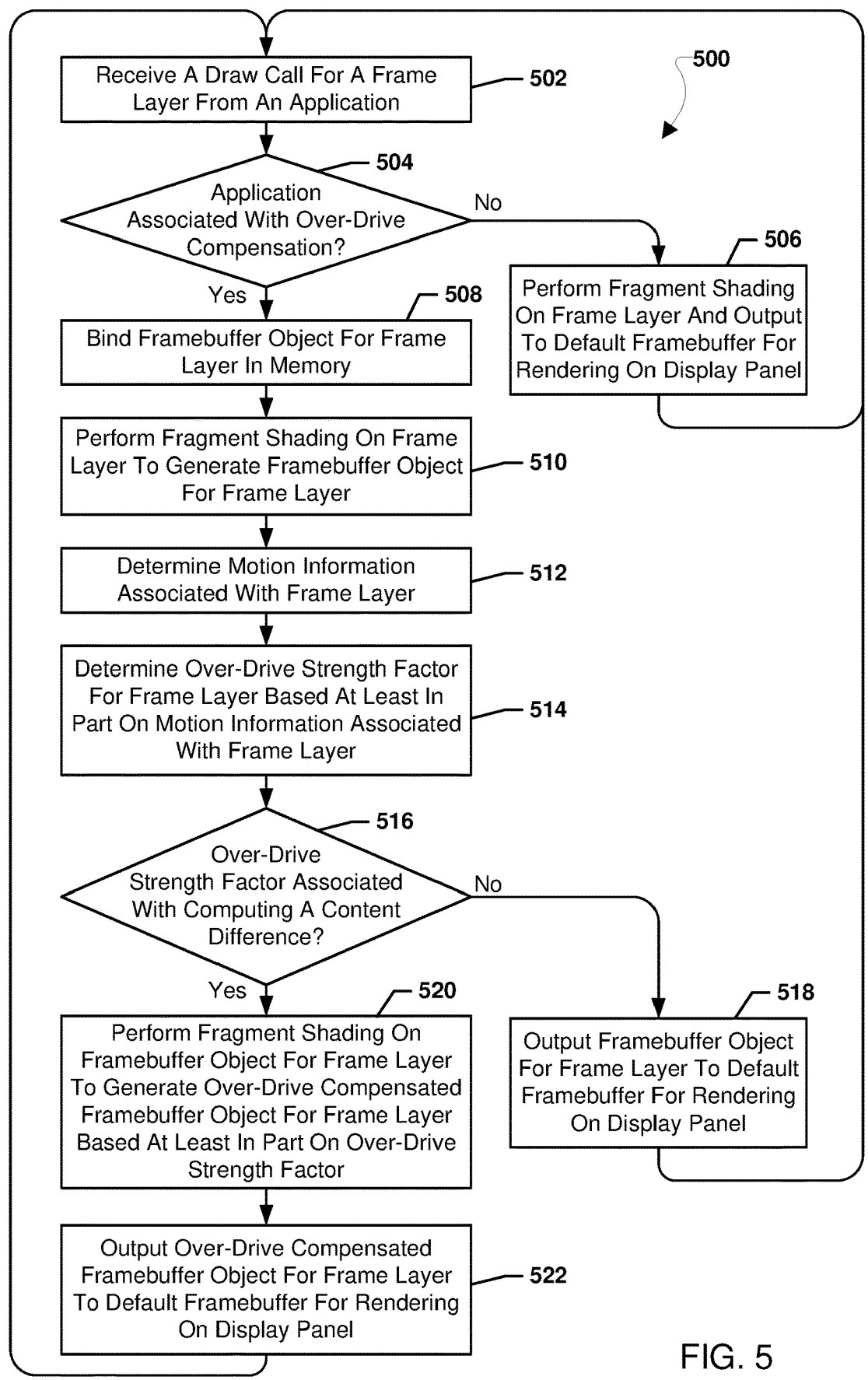
FIG. 5 is a process flow diagram illustrating a method per layer motion adaptive over-drive strength control for a display panel in accordance with various embodiments.

FIG. 5 illustrates a method 500 for per layer motion adaptive over-drive strength control for a display panel in accordance with various embodiments. With reference to FIGS. 1-5, the method 500 may be performed by a processor (e.g., applications processor 216, graphics processor 214, coprocessor 218, etc.) of a wireless device (e.g., the wireless device 120a-120e, 200, 320) including a display panel (e.g., the display panel 271).

In block 502, the processor may receive a draw call for a frame layer from an application. A frame layer may be a graphical object associated with an application, such as a window to be displayed on a display panel, a game screen to be displayed on a display panel, an animation of another object (e.g., an animation of text, etc.) to be displayed on a display panel, a user interface (UI) animation to be displayed on a display panel, etc. Draw calls may be indications from an application to elements of a graphics processing pipeline of a wireless device indicating a frame layer to be rendered on a display panel.

In determination block 504, the processor may determine whether the application is associated with over-drive compensation. In various embodiments, draw calls for frame layers may be handled differently for fragment shading based on whether the application generating the draw call is associated with over-drive compensation. Some applications, such as video applications, may not be associated with over-drive compensation. Some applications, such as applications in which line average pixel values may not change significantly between sequential frames, (e.g., text sliding animation applications, simple game applications, UI animation applications, etc.), may be associated with over-drive compensation. As an example, a list of applications associated with over-drive compensation may be maintained by the processor and the application generating the draw call may be checked against the list of applications associated with over-drive compensation to determine whether the application is associated with over-drive compensation.

In response to determining that the application is not associated with over-drive compensation (i.e., determination block 504="No"), the processor may perform fragment shading on the frame layer and outputting the resulting pixel values to a default framebuffer for rendering on a display panel (e.g., display panel 271) in block 506. Draw calls from applications not associated with over-drive compensation may be handled in a typical manner with fragment shading performed and the output sent to the default framebuffer for rendering on a display panel. In this manner, draw calls for frame layers of applications not associated with over-drive compensation may result in fragment shading for the frame layers being performed without framebuffer objects for the frame layers being stored for use in subsequent fragment shading and/or without over-drive strength factors being computed and/or applied to the frame layers of applications not associated with over-drive compensation. After performing fragment shading in block 506, the processor may await a next draw call in block 502.

In response to determining that the application is associated with over-drive compensation (i.e., determination block 504="Yes"), the processor may bind a framebuffer object for the frame layer in a memory in block 508. In some embodiments, a framebuffer object may be created and/or bound to a frame layer in a memory. For example, in response to determining that a draw call for a frame layer is from an application associated with over-drive compensation, the processor may bind a framebuffer object for the frame layer in a memory. In this manner, a memory location for associated with the frame layer may be reserved for the result of fragment shading of the frame layer.

In block 510, the processor may perform fragment shading on the frame layer to generate a framebuffer object for the frame layer. The fragment shading may generate a framebuffer object for the frame layer including pixel values for the frame layer and other data, such as texture data for the frame layer, etc.

In block 512, the processor may determine motion information associated with the frame layer. As an example, the motion information may be a motion speed (e.g., pixels per frame (pixel/frame)) of a motion vector of the frame layer. As another example, the motion information may be a motion vector value itself (e.g., a value indicating a direction, such as top-to-bottom, bottom-to-top, etc., a value indicating there is no motion, such as a zero value, etc.) Motion information may be determined based on frame layer information, such as animation information for a frame layer provided by a window/view manager. In some embodiments, the motion information may be detected and computed per frame layer and different motion information may be determined for different frame layers.

In block 514, the processor may determine an over-drive strength factor for the frame layer based at least in part on the motion information associated with the frame layer. In some embodiments, over-drive strength factors may be associated with different motion information. For example, motion information indicating faster motion, such as higher motion speeds, may be associated with stronger (or higher value) over-drive factors and motion information indicating slower motion, such as slower motion speeds, may be associated with weaker (or lower value) over-drive factors. As a specific example, motion speed ranges, such as pixels per frame speeds, may be correlated with over-drive strength factors. The processor may compare the motion speed of the frame layer to the motion speed ranges to determine the over-drive strength factor correlated with the motion speed range in which the motion speed of a frame layer falls. In various embodiments, motion information correlations to over-drive strength factors and/or the over-drive strength factors may be determined in various manners, such as by in-lab tuning, AI training, user settings, etc.

In determination block 516, the processor may determine whether the over-drive strength factor is associated with computing a content difference. In some embodiments, an over-drive strength factor may be associated with computing a content difference. For example, over-drive strength factors may be compared to a strength threshold to determine whether or not to compute a content difference for a current frame. As a specific example, an over-drive strength factor being equal to or greater than a strength factor may indicate the over-drive strength factor is associated with computing a content difference. As another specific example, an over-drive strength factor being greater than a strength factor may indicate the over-drive strength factor is associated with computing a content difference. As another example, an over-drive strength factor being less than a strength factor may indicate the over-drive strength factor is associated with computing a content difference.

In response to determining that the over-drive strength factor is not associated with computing a content difference (i.e., determination block 516="No"), the processor may output the framebuffer object for the frame layer to the default framebuffer for rendering on the display panel (e.g., display panel 271) in block 518. In various embodiments, in response to determining that an over-drive strength factor is not associated with computing a content difference, the processor may skip computing a content difference between a current frame layer and a prior frame layer. For example, in response to determining that an over-drive strength factor is not associated with computing a content difference, the processor may not determine pixel differences between a frame "N" and the prior frame "N−1". In this manner, in response to determining that an over-drive strength factor is not associated with computing a content difference, a processor of a wireless device, such as an application processor, GPU, etc., may conserve processing resources and save power by not computing a content difference. After outputting the framebuffer object for the frame layer, the processor may await a next draw call in block 502.

In response to determining that the over-drive strength factor is associated with computing a content difference (i.e., determination block 516="Yes"), the processor may perform fragment shading on the framebuffer object for the frame layer to generate an over-drive compensated framebuffer object for the frame layer based at least in part on the over-drive strength factor in block 520. In various embodiments, the over-drive strength factor may be used to modify the pixel values of pixels of the frame layer to generate an over-drive compensated framebuffer object for the frame layer. For example, the over-drive strength factor may be added to and/or multiplied by the pixel values to increase the pixel values.

In block 522, the processor may output the over-drive compensated framebuffer object for the frame layer to the default framebuffer for rendering on the display panel (e.g., display panel 271). After outputting the over-drive compensated framebuffer object for the frame layer, the processor may await a next draw in block 502.

Figure 6A:
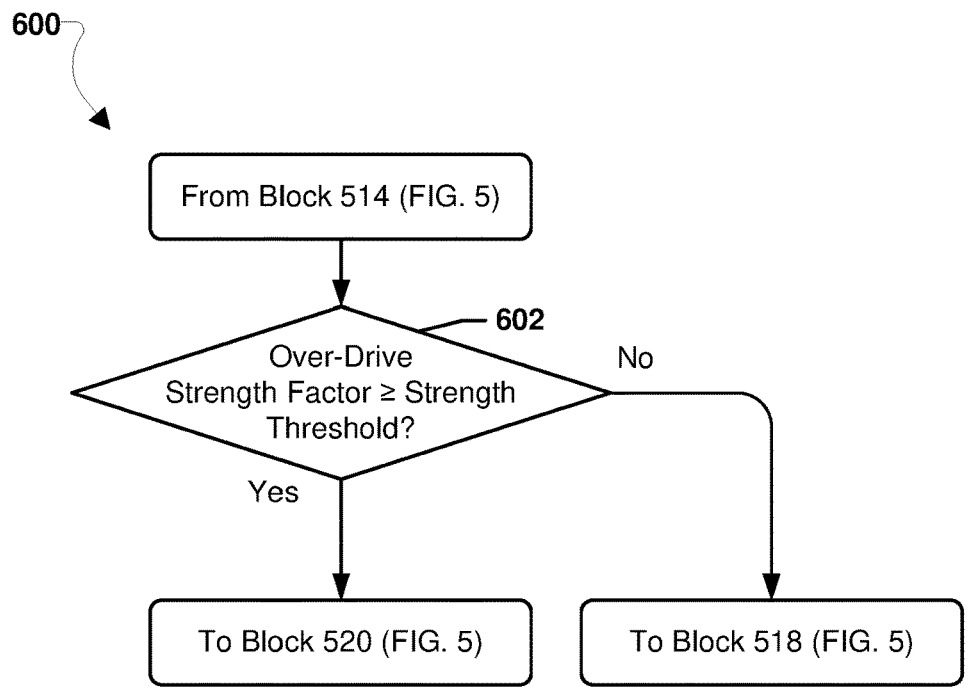
FIG. 6A is a process flow diagram illustrating a method for determining whether an over-drive strength factor is associated with computing a content difference in accordance with various embodiments.

FIG. 6A illustrates a method 600 for determining whether an over-drive strength factor is associated with computing a content difference in accordance with various embodiments. With reference to FIGS. 1-6A, the method 600 may be performed by a processor (e.g., applications processor 216, graphics processor 214, coprocessor 218, etc.) of a wireless device (e.g., the wireless device 120a-120e, 200, 320) including a display panel (e.g., the display panel 271). In various embodiments, the operations of the method 600 may be performed in conjunction with the operations of the method 500 (FIG. 5). As a specific example, the operations of the method 600 may be example operations of determination block 516 of the method 500 (FIG. 5) to determine whether the over-drive strength factor is associated with computing a content difference. As a specific example, the operations of the method 600 may be performed in response to determining an over-drive strength factor for the frame layer based at least in part on the motion information associated with the frame layer in block 514 of the method 500 (FIG. 5).

In determination block 602, the processor may determine whether the over-drive strength factor is greater than or equal to a strength threshold. As a specific example, an over-drive strength factor being equal to or greater than a strength factor may indicate the over-drive strength factor is associated with computing a content difference.

In response to determining that the over-drive strength factor is greater than or equal to a strength threshold (i.e., determination block 602="Yes"), the processor may perform fragment shading on the framebuffer object for the frame layer to generate an over-drive compensated framebuffer object for the frame layer based at least in part on the over-drive strength factor in block 520 of the method 500 as described.

In response to determining that the over-drive strength factor is less than a strength threshold (i.e., determination block 602="No"), the processor may output the framebuffer object for the frame layer to the default framebuffer for rendering on the display panel (e.g., display panel 271) in block 518 of the method 500 as described.

Figure 6B:
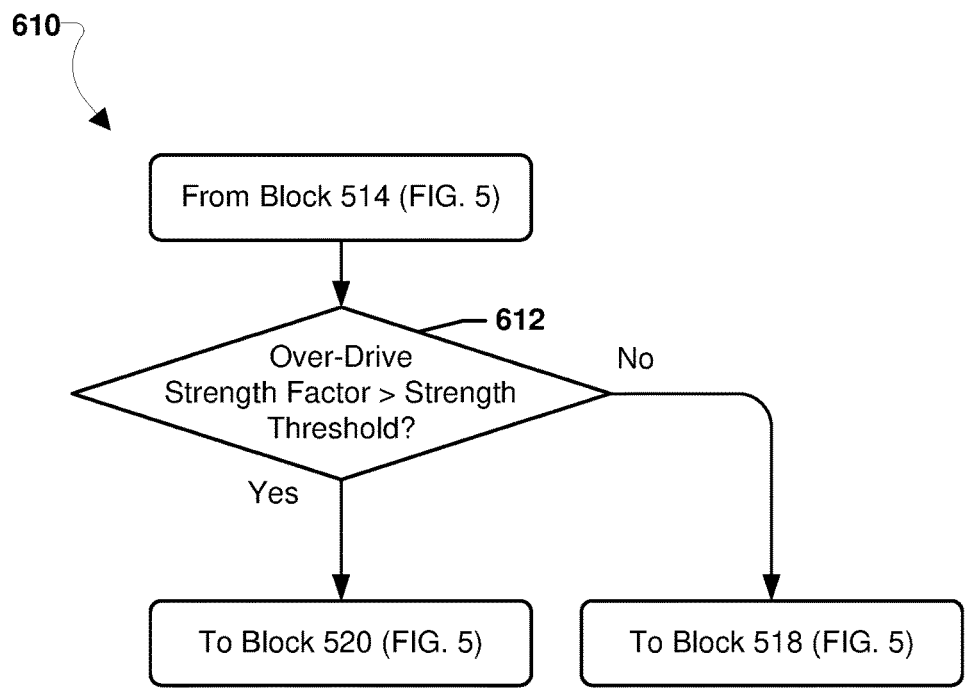
FIG. 6B is a process flow diagram illustrating a method for determining whether an over-drive strength factor is associated with computing a content difference in accordance with various embodiments.

FIG. 6B illustrates a method 610 for determining whether an over-drive strength factor is associated with computing a content difference in accordance with various embodiments. With reference to FIGS. 1-6B, the method 610 may be performed by a processor (e.g., applications processor 216, graphics processor 214, coprocessor 218, etc.) of a wireless device (e.g., the wireless device 120a-120e, 200, 320) including a display panel (e.g., the display panel 271). In various embodiments, the operations of the method 610 may be performed in conjunction with the operations of the method 500 (FIG. 5). As a specific example, the operations of the method 610 may be example operations of determination block 516 of the method 500 (FIG. 5) to determine whether the over-drive strength factor is associated with computing a content difference. As a specific example, the operations of the method 610 may be performed in response to determining an over-drive strength factor for the frame layer based at least in part on the motion information associated with the frame layer in block 514 of the method 500 as described.

In determination block 612, the processor may determine whether the over-drive strength factor is greater than a strength threshold. As another specific example, an over-drive strength factor being greater than a strength factor may indicate the over-drive strength factor is associated with computing a content difference.

In response to determining that the over-drive strength factor is greater than a strength threshold (i.e., determination block 612="Yes"), the processor may perform fragment shading on the framebuffer object for the frame layer to generate an over-drive compensated framebuffer object for the frame layer based at least in part on the over-drive strength factor in block 520 of the method 500 as described.

In response to determining that the over-drive strength factor is less than or equal to a strength threshold (i.e., determination block 612="No"), the processor may output the framebuffer object for the frame layer to the default framebuffer for rendering on the display panel (e.g., display panel 271) in block 518 of the method 500.

Figure 7:
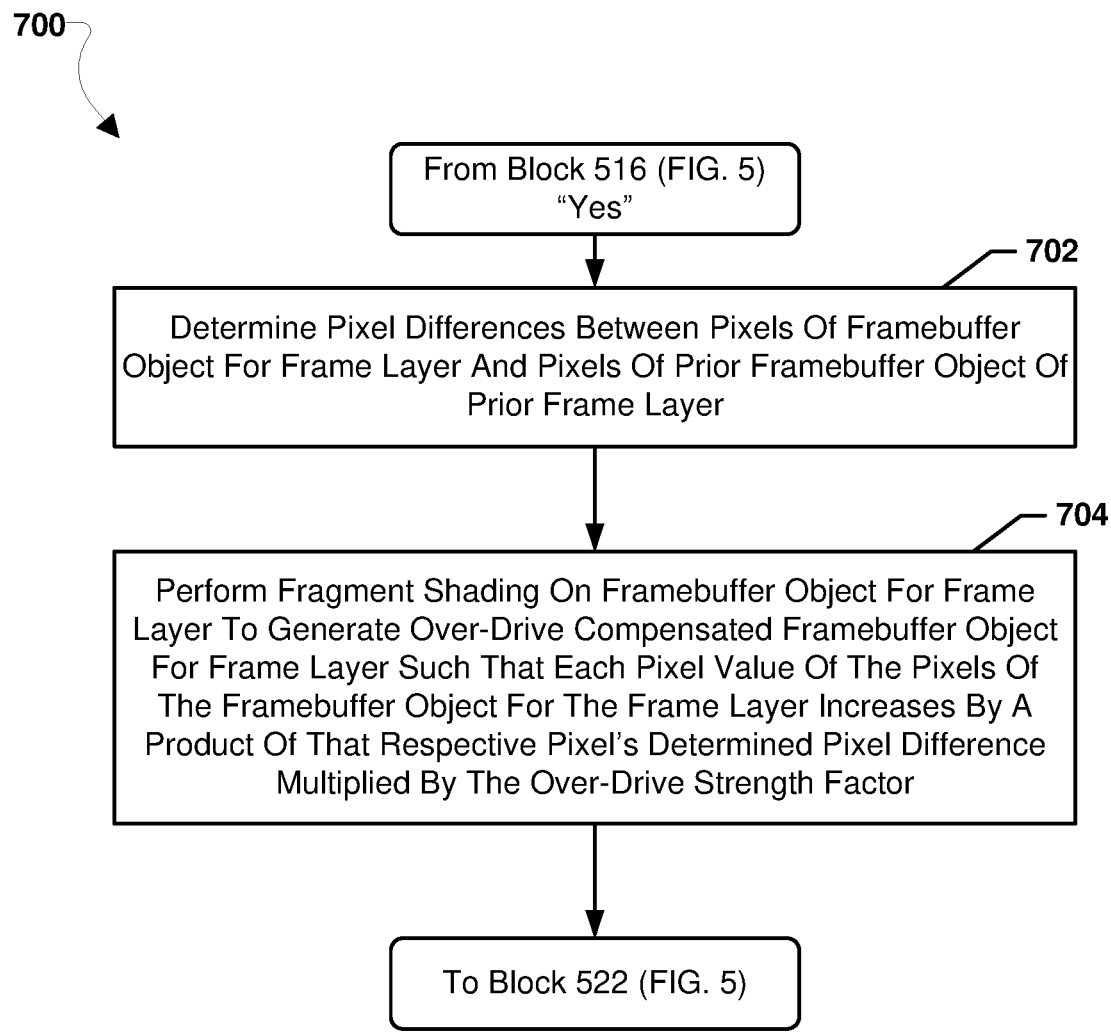
FIG. 7 is a process flow diagram illustrating a method for performing fragment shading on a framebuffer object for a frame layer to generate an over-drive compensated framebuffer object for the frame layer in accordance with various embodiments.

FIG. 7 illustrates a method 700 for performing fragment shading on a framebuffer object for a frame layer to generate an over-drive compensated framebuffer object for the frame layer in accordance with various embodiments. With reference to FIGS. 1-7, the method 700 may be performed by a processor (e.g., applications processor 216, graphics processor 214, coprocessor 218, etc.) of a wireless device (e.g., the wireless device 120a-120e, 200, 320) including a display panel (e.g., the display panel 271).

In various embodiments, the operations of the method 700 may be performed in conjunction with the operations of the methods 500 (FIG. 5), 600 (FIG. 6A), and/or 610 (FIG. 6B). As an example, the operations of the method 700 may be example operations of block 520 of the method 500 (FIG. 5) to perform fragment shading on the framebuffer object for the frame layer to generate an over-drive compensated framebuffer object for the frame layer based at least in part on the over-drive strength factor. As another example, the operations of the method 700 may be performed in response to determining that the over-drive strength factor is associated with computing a content difference (i.e., determination block 516="Yes"), in determination block 516 of the method 500 (FIG. 5). As another example, the operations of the method 700 may be performed in response to determining that the over-drive strength factor is greater than or equal to a strength threshold (i.e., determination block 602="Yes") in determination block 602 of the method 600 (FIG. 6A). As another example, the operations of the method 700 may be performed in response to determining that the over-drive strength factor is greater than a strength threshold (i.e., determination block 612="Yes") in determination block 612 of the method 610 (FIG. 6B).

In block 702, the processor may compute or otherwise determine pixel differences between pixels of the framebuffer object for the frame layer and pixels of a prior framebuffer object of a prior frame layer. As a specific example, pixel differences between a frame layer "N" and the prior frame layer "N−1" may be determined. In various embodiments, framebuffer objects for frame layers may be saved as frame layers are handled for fragment shading. As the framebuffer objects may be stored in memory per frame layer, framebuffer objects may be compared to one another to determine content changes between frame layers. For example, the framebuffer object of the layer "N" may be compared to the framebuffer object for frame layer "N−1".

In block 704, the processor may perform fragment shading on the framebuffer object for the frame layer to generate an over-drive compensated framebuffer object for the frame layer such that each pixel value of the pixels of the frame buffer object for the frame layer increases by a product of that respective pixel's determined pixel difference multiplied by the over-drive strength factor. Using the determined pixel differences, the processor may perform fragment shading on the framebuffer object for the frame layer to generate an over-drive compensated framebuffer object for the frame layer such that each pixel value of the pixels of the frame buffer object for the frame layer increases by a product of that respective pixel's determined pixel difference multiplied by the over-drive strength factor. For example, for frame layer "N", the pixel (x,y) may have its pixel value (e.g., pixel value (x,y)) set to its original pixel value (e.g., original pixel value (x,y)) in the framebuffer object plus the pixel difference between frame layer N and frame layer N−1 (e.g., pixel diff) multiplied by the over-drive factor of frame layer N (e.g., OD str factor of N) (e.g., pixel value (x,y) =original pixel value (x,y)+(pixel diff*OD str factor of N)).

In response to performing fragment shading, the processor may proceed to block 522 of the method 500 (FIG. 5) to output the over-drive compensated framebuffer object for the frame layer to the default framebuffer for rendering on the display panel (e.g., display panel 271).

Figure 8:
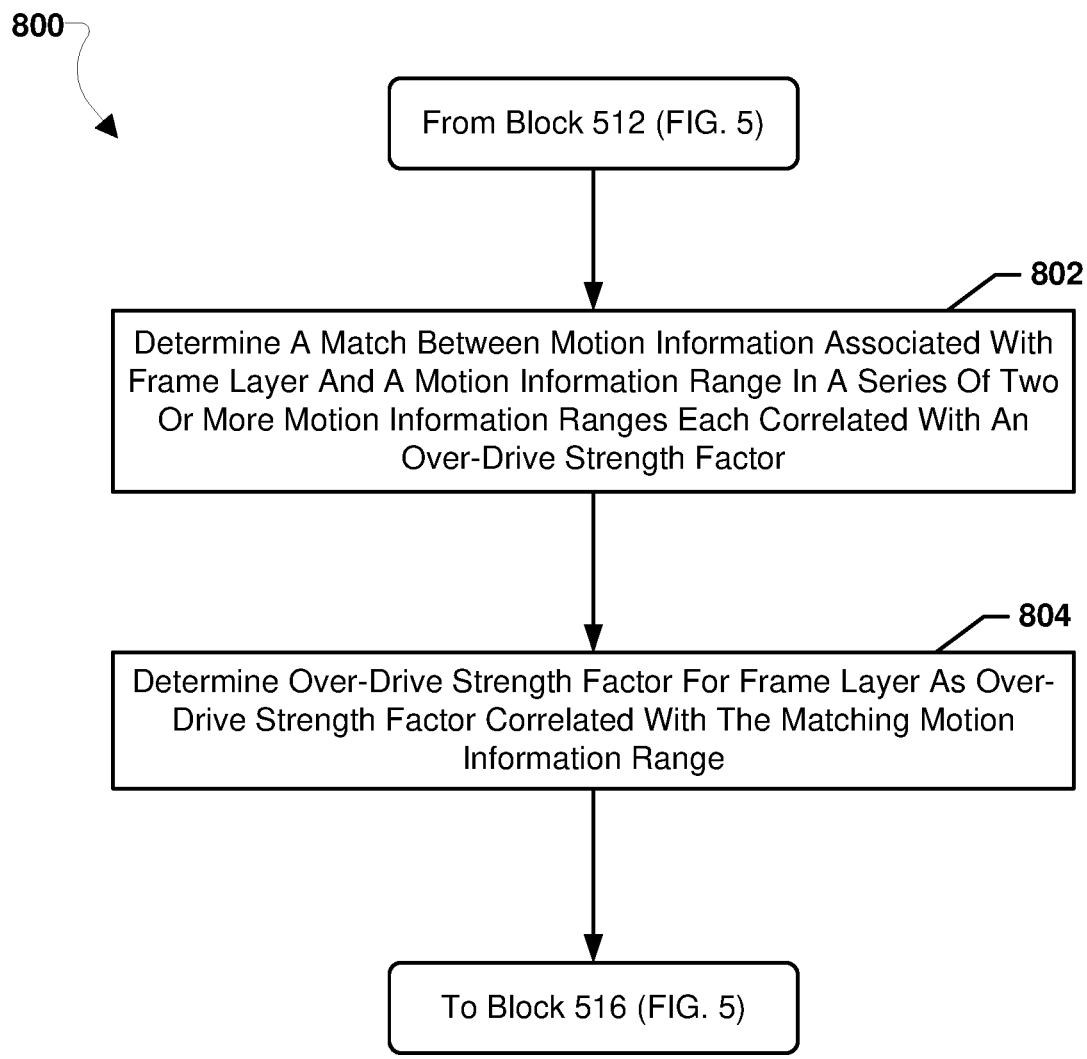
FIG. 8 is a process flow diagram illustrating a method for determining an over-drive strength factor for a frame layer in accordance with various embodiments.

FIG. 8 illustrates a method 800 for determining an over-drive strength factor for a frame layer in accordance with various embodiments. With reference to FIGS. 1-8, the method 800 may be performed by a processor (e.g., applications processor 216, graphics processor 214, coprocessor 218, etc.) of a wireless device (e.g., the wireless device 120a-120e, 200, 320) including a display panel (e.g., the display panel 271). In various embodiments, the operations of the method 800 may be performed in conjunction with the operations of the methods 500 (FIG. 5), 600 (FIG. 6A), 610 (FIG. 6B), and/or 700 (FIG. 7). As an example, the operations of the method 800 may be example operations of block 514 of the method 500 (FIG. 5) to determine an over-drive strength factor for the frame layer based at least in part on the motion information associated with the frame layer. As another example, the operations of the method 800 may be performed in response to determining motion information associated with the frame layer in block 512 of the method 500 (FIG. 5).

In block 802, the processor may determine a match between the motion information associated with the frame layer and a motion information range in a series of two or more motion information ranges each correlated with an over-drive strength factor. As a specific example, motion speed ranges, such as pixels per frame speeds, may be correlated with over-drive strength factors. The processor may compare the motion speed of the frame layer to the motion speed ranges to determine the matching motion speed range in which the motion speed of a frame layer falls.

In block 804, the processor may determine the over-drive strength factor for the frame layer as the over-drive strength factor correlated with the matching motion information range. As a specific example, the processor may determine the over-drive strength correlated with the matching motion speed range as the over-drive strength factor for the frame layer.

In response to determining the over-drive strength factor, the processor may determine whether the over-drive strength factor is associated with computing a content difference in determination block 516 of the method 500 as described.

Figure 9:
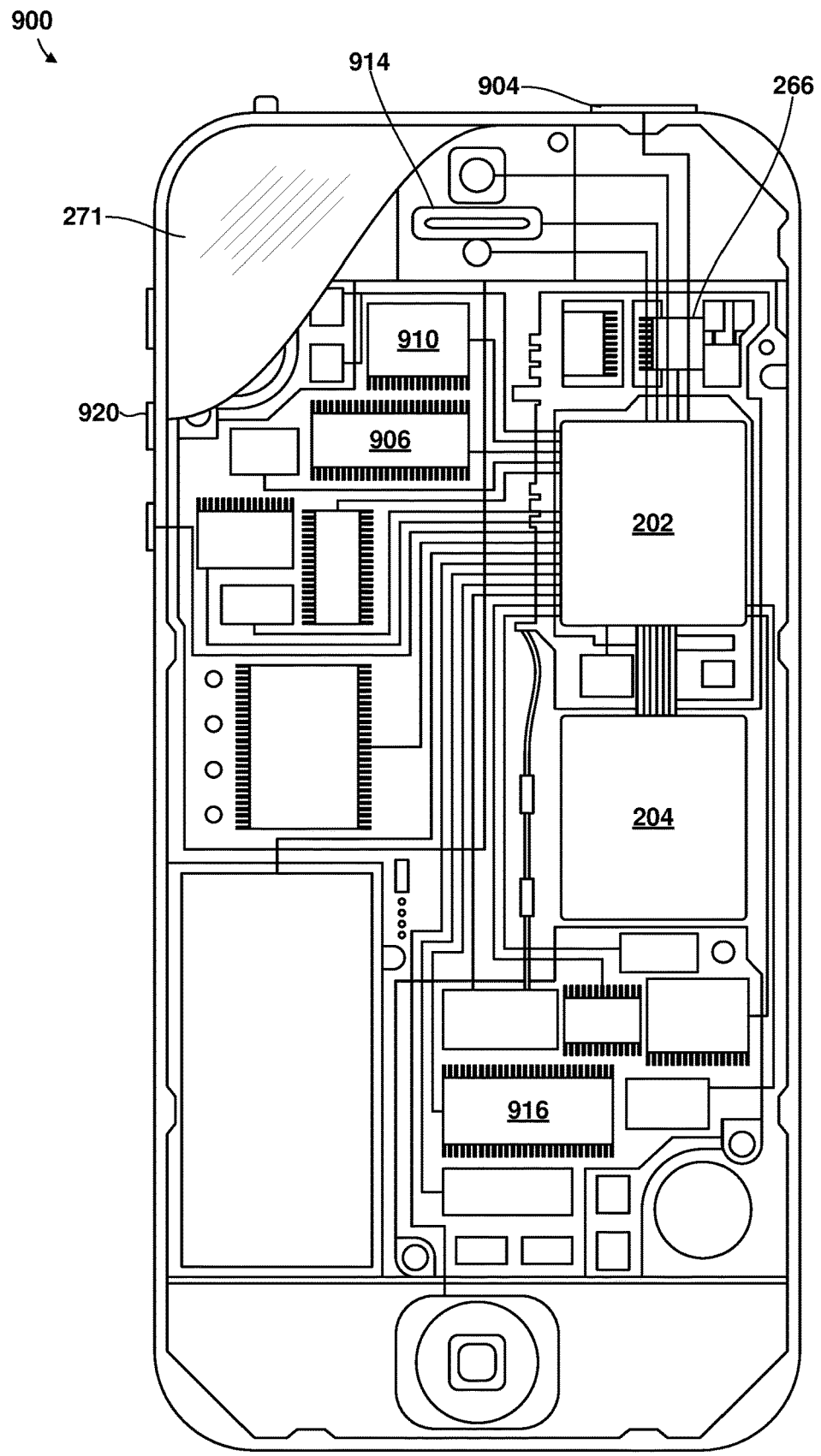
FIG. 9 is a component block diagram of a wireless device suitable for use with various embodiments.

FIG. 9 is a component block diagram of a wireless device 900 suitable for use with various embodiments. With reference to FIGS. 1-9, various embodiments may be implemented on a variety of wireless devices 900 (e.g., the wireless device 120, 120a-120e, 200), an example of which is illustrated in FIG. 9 in the form of a smartphone. The wireless device 900 may include a first SOC 202 (e.g., a SOC-CPU) coupled to a second SOC 204 (e.g., a 5G capable SOC). The first and second SOCs 202, 204 may be coupled to internal memory 906, 916, a display panel 271, and to a speaker 914. Additionally, the wireless device 900 may include an antenna 904 for sending and receiving electromagnetic radiation that may be connected to a wireless data link and/or cellular telephone transceiver 266 coupled to one or more processors in the first and/or second SOCs 202, 204. The wireless device 900 may also include menu selection buttons or rocker switches 920 for receiving user inputs.

The wireless device 900 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 910 may include a digital signal processor (DSP) circuit (not shown separately).

The processors of the wireless network computing device 900 and the wireless device 900 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory 906, 916 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500, 600, 610, 700, and/or 800 may be substituted for or combined with one or more operations of the methods 500, 600, 610, 700, and/or 800.

Implementation examples of wireless device embodiments are described in the following paragraphs. While some of the following implementation examples are described in terms of example methods, further example implementations may include: the example methods discussed in the following paragraphs implemented by a wireless device including an apparatus with a processing system configured with processor-executable instructions to perform operations of the methods of the following implementation examples; the example methods discussed in the following paragraphs implemented by a wireless device including means for performing functions of the methods of the following implementation examples; and the example methods discussed in the following paragraphs may be implemented as a non-transitory processor-readable storage medium having stored thereon processor-executable instructions configured to cause a processor of a wireless device to perform the operations of the methods of the following implementation examples.

Example 1. A method performed by a processor of a wireless device for per layer motion adaptive over-drive strength control for a display panel, including: receiving a draw call for a first frame layer from an application; performing fragment shading on the first frame layer to generate a first framebuffer object for the first frame layer; determining motion information associated with the first frame layer; determining a first over-drive strength factor for the first frame layer based at least in part on the motion information associated with the first frame layer; determining whether the first over-drive strength factor is associated with computing a content difference; and in response to determining that the first over-drive strength factor is associated with computing a content difference: performing fragment shading on the first framebuffer object for the first frame layer to generate an over-drive compensated framebuffer object for the first frame layer based at least in part on the first over-drive strength factor; and outputting the over-drive compensated framebuffer object for the first frame layer to a default framebuffer for rendering on the display panel.

Example 2. The method of example 1, further including outputting the first framebuffer object for the first frame layer to the default framebuffer for rendering on the display panel in response to determining that the first over-drive strength factor is not associated with computing a content difference.

Example 3. The method of any of examples 1-2, in which determining whether the first over-drive strength factor is associated with computing a content difference includes determining whether the first over-drive strength factor is greater than or equal to a strength threshold.

Example 4. The method of any of examples 1-3, in which performing fragment shading on the first framebuffer object for the first frame layer to generate an over-drive compensated framebuffer object for the first frame layer based at least in part on the first over-drive strength factor includes: determining pixel differences between pixels of the first framebuffer object for the first frame layer and pixels of a prior framebuffer object of a prior frame layer; and performing fragment shading on the first framebuffer object for the first frame layer to generate the over-drive compensated framebuffer object for the first frame layer such that each pixel value of the pixels of the first framebuffer object for the first frame layer increases by a product of that respective pixel's determined pixel difference multiplied by the first over-drive strength factor.

Example 5. The method of any of examples 1-4, further including: receiving a draw call for a second frame layer from the application; performing fragment shading on the second frame layer to generate a second framebuffer object for the second frame layer; determining motion information associated with the second frame layer; determining a second over-drive strength factor for the second frame layer based at least in part on the motion information associated with the second frame layer; determining whether the second over-drive strength factor is associated with computing a content difference; and in response to determining that the second over-drive strength factor is associated with computing a content difference: determining pixel differences between pixels of the second framebuffer object and pixels of the first framebuffer object; performing fragment shading on the second framebuffer object for the second frame layer to generate the over-drive compensated framebuffer object for the second frame layer such that each pixel value of the pixels of the second framebuffer object for the second frame layer increases by a product of that respective pixel's determined pixel difference multiplied by the second over-drive strength factor; and outputting the over-drive compensated framebuffer object for the second frame layer to the default framebuffer for rendering on the display panel.

Example 6. The method of example 5, in which the first over-drive strength factor and the second over-drive strength factor are different values.

Example 7. The method of any of examples 1-6, in which the motion information associated with the first frame layer is a motion speed of a motion vector for the first frame layer.

Example 8. The method of any of examples 1-7, in which determining the first over-drive strength factor for the first frame layer based at least in part on the motion information associated with the first frame layer includes: determining a match between the motion information associated with the first frame layer and a motion information range in a series of two or more motion information ranges each correlated with an over-drive strength factor; and determining the first over-drive strength factor for the first frame layer as the over-drive strength factor correlated with matching motion information range.

Example 9. The method of any of examples 1-8, in which the display panel is a liquid-crystal display (LCD) panel or an organic light-emitting diode (OLED) panel.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A wireless device, comprising:
   a display panel; and
   a processor coupled to the display panel, wherein the processor is configured to:
   receive a draw call for a first frame layer from an application;
   perform fragment shading on the first frame layer to generate a first framebuffer object for the first frame layer;
   determine motion information associated with the first frame layer;
   determine a first over-drive strength factor for the first frame layer based at least in part on the motion information associated with the first frame layer;
   determine whether the first over-drive strength factor is associated with computing a content difference; and
   in response to determining that the first over-drive strength factor is associated with computing a content difference to:
   perform fragment shading on the first framebuffer object for the first frame layer to generate an over-drive compensated framebuffer object for the first frame layer based at least in part on the first over-drive strength factor; and output the over-drive compensated framebuffer object for the first frame layer to a default framebuffer for rendering on the display panel.

2. The wireless device of claim 1, wherein the processor is further configured to outputting the first framebuffer object for the first frame layer to the default framebuffer for rendering on the display panel in response to determining that the first over-drive strength factor is not associated with computing a content difference.

3. The wireless device of claim 1, wherein the processor is configured to determine whether the first over-drive strength factor is associated with computing a content difference by determining whether the first over-drive strength factor is greater than or equal to a strength threshold.

4. The wireless device of claim 1, wherein the processor is configured to perform fragment shading on the first framebuffer object for the first frame layer to generate an over-drive compensated framebuffer object for the first frame layer based at least in part on the first over-drive strength factor by:

determining pixel differences between pixels of the first framebuffer object for the first frame layer and pixels of a prior framebuffer object of a prior frame layer; and performing fragment shading on the first framebuffer object for the first frame layer to generate the over-drive compensated framebuffer object for the first frame layer such that each pixel value of the pixels of the first framebuffer object for the first frame layer increases by a product of that respective pixel's determined pixel difference multiplied by the first over-drive strength factor.

5. The wireless device of claim 4, wherein the processor is further configured to:

receive a draw call for a second frame layer from the application;

perform fragment shading on the second frame layer to generate a second framebuffer object for the second frame layer;

determine motion information associated with the second frame layer;

determine a second over-drive strength factor for the second frame layer based at least in part on the motion information associated with the second frame layer;

determine whether the second over-drive strength factor is associated with computing a content difference; and in response to determining that the second over-drive strength factor is associated with computing a content difference to:

determine pixel differences between pixels of the second framebuffer object and pixels of the first framebuffer object;

perform fragment shading on the second framebuffer object for the second frame layer to generate the over-drive compensated framebuffer object for the second frame layer such that each pixel value of the pixels of the second framebuffer object for the second frame layer increases by a product of that respective pixel's determined pixel difference multiplied by the second over-drive strength factor; and output the over-drive compensated framebuffer object for the second frame layer to the default framebuffer for rendering on the display panel.

6. The wireless device of claim 5, wherein the first over-drive strength factor and the second over-drive strength factor are different values.

7. The wireless device of claim 1, wherein the motion information associated with the first frame layer is a motion speed of a motion vector for the first frame layer.

8. The wireless device of claim 1, wherein the processor is further configured to determine the first over-drive strength factor for the first frame layer based at least in part on the motion information associated with the first frame layer by:

determining a match between the motion information associated with the first frame layer and a motion information range in a series of two or more motion information ranges each correlated with an over-drive strength factor; and determining the first over-drive strength factor for the first frame layer as the over-drive strength factor correlated with matching motion information range.

9. The wireless device of claim 1, wherein the display panel is a liquid-crystal display (LCD) panel or an organic light-emitting diode (OLED) panel.

10. A wireless device, comprising:

a display panel;

means for receiving a draw call for a first frame layer from an application;

means for performing fragment shading on the first frame layer to generate a first framebuffer object for the first frame layer;

means for determining motion information associated with the first frame layer;

means for determining a first over-drive strength factor for the first frame layer based at least in part on the motion information associated with the first frame layer;

means for determining whether the first over-drive strength factor is associated with computing a content difference;

means for performing fragment shading on the first framebuffer object for the first frame layer to generate an over-drive compensated framebuffer object for the first frame layer based at least in part on the first over-drive strength factor in response to determining that the first over-drive strength factor is associated with computing a content difference; and means for outputting the over-drive compensated framebuffer object for the first frame layer to a default framebuffer for rendering on the display panel in response to determining that the first over-drive strength factor is associated with computing a content difference.

11. The wireless device of claim 10, further comprising means for outputting the first framebuffer object for the first frame layer to the default framebuffer for rendering on the display panel in response to determining that the first over-drive strength factor is not associated with computing a content difference.

12. The wireless device of claim 10, wherein means for determining whether the first over-drive strength factor is associated with computing a content difference comprises means for determining whether the first over-drive strength factor is greater than or equal to a strength threshold.

13. The wireless device of claim 10, wherein means for performing fragment shading on the first framebuffer object for the first frame layer to generate an over-drive compensated framebuffer object for the first frame layer based at least in part on the first over-drive strength factor comprises:

means for determining pixel differences between pixels of the first framebuffer object for the first frame layer and pixels of a prior framebuffer object of a prior frame layer; and means for performing fragment shading on the first framebuffer object for the first frame layer to generate the over-drive compensated framebuffer object for the first frame layer such that each pixel value of the pixels of the first framebuffer object for the first frame layer increases by a product of that respective pixel's determined pixel difference multiplied by the first over-drive strength factor.

14. The wireless device of claim 13, further comprising:
means for receiving a draw call for a second frame layer from the application;
means for performing fragment shading on the second frame layer to generate a second framebuffer object for the second frame layer;
means for determining motion information associated with the second frame layer;
means for determining a second over-drive strength factor for the second frame layer based at least in part on the motion information associated with the second frame layer;
means for determining whether the second over-drive strength factor is associated with computing a content difference;
means for determining pixel differences between pixels of the second framebuffer object and pixels of the first framebuffer object in response to determining that the second over-drive strength factor is associated with computing a content difference;
means for performing fragment shading on the second framebuffer object for the second frame layer to generate the over-drive compensated framebuffer object for the second frame layer such that each pixel value of the pixels of the second framebuffer object for the second frame layer increases by a product of that respective pixel's determined pixel difference multiplied by the second over-drive strength factor in response to determining that the second over-drive strength factor is associated with computing a content difference; and
means for outputting the over-drive compensated framebuffer object for the second frame layer to the default framebuffer for rendering on the display panel in response to determining that the second over-drive strength factor is associated with computing a content difference.

15. The wireless device of claim 14, wherein the first over-drive strength factor and the second over-drive strength factor are different values.

16. The wireless device of claim 10, wherein the motion information associated with the first frame layer is a motion speed of a motion vector for the first frame layer.

17. The wireless device of claim 10, wherein means for determining the first over-drive strength factor for the first frame layer based at least in part on the motion information associated with the first frame layer comprises:
means for determining a match between the motion information associated with the first frame layer and a motion information range in a series of two or more motion information ranges each correlated with an over-drive strength factor; and
means for determining the first over-drive strength factor for the first frame layer as the over-drive strength factor correlated with matching motion information range.

18. The wireless device of claim 10, wherein the display panel is a liquid-crystal display (LCD) panel or an organic light-emitting diode (OLED) panel.

19. A method performed by a processor of a wireless device for per layer motion adaptive over-drive strength control for a display panel, comprising:
receiving a draw call for a first frame layer from an application;
performing fragment shading on the first frame layer to generate a first framebuffer object for the first frame layer;
determining motion information associated with the first frame layer;
determining a first over-drive strength factor for the first frame layer based at least in part on the motion information associated with the first frame layer;
determining whether the first over-drive strength factor is associated with computing a content difference; and
in response to determining that the first over-drive strength factor is associated with computing a content difference:
performing fragment shading on the first framebuffer object for the first frame layer to generate an over-drive compensated framebuffer object for the first frame layer based at least in part on the first over-drive strength factor; and
outputting the over-drive compensated framebuffer object for the first frame layer to a default framebuffer for rendering on the display panel.

20. The method of claim 19, further comprising outputting the first framebuffer object for the first frame layer to the default framebuffer for rendering on the display panel in response to determining that the first over-drive strength factor is not associated with computing a content difference.

21. The method of claim 19, wherein determining whether the first over-drive strength factor is associated with computing a content difference comprises determining whether the first over-drive strength factor is greater than or equal to a strength threshold.

22. The method of claim 19, wherein performing fragment shading on the first framebuffer object for the first frame layer to generate an over-drive compensated framebuffer object for the first frame layer based at least in part on the first over-drive strength factor comprises:
determining pixel differences between pixels of the first framebuffer object for the first frame layer and pixels of a prior framebuffer object of a prior frame layer; and
performing fragment shading on the first framebuffer object for the first frame layer to generate the over-drive compensated framebuffer object for the first frame layer such that each pixel value of the pixels of the first framebuffer object for the first frame layer increases by a product of that respective pixel's determined pixel difference multiplied by the first over-drive strength factor.

23. The method of claim 22, further comprising:
receiving a draw call for a second frame layer from the application;
performing fragment shading on the second frame layer to generate a second framebuffer object for the second frame layer;
determining motion information associated with the second frame layer;
determining a second over-drive strength factor for the second frame layer based at least in part on the motion information associated with the second frame layer;

determining whether the second over-drive strength factor is associated with computing a content difference; and in response to determining that the second over-drive strength factor is associated with computing a content difference:

determining pixel differences between pixels of the second framebuffer object and pixels of the first framebuffer object;

performing fragment shading on the second framebuffer object for the second frame layer to generate the over-drive compensated framebuffer object for the second frame layer such that each pixel value of the pixels of the second framebuffer object for the second frame layer increases by a product of that respective pixel's determined pixel difference multiplied by the second over-drive strength factor; and outputting the over-drive compensated framebuffer object for the second frame layer to the default framebuffer for rendering on the display panel.

24. The method of claim 23, wherein the first over-drive strength factor and the second over-drive strength factor are different values.

25. The method of claim 19, wherein the motion information associated with the first frame layer is a motion speed of a motion vector for the first frame layer.

26. The method of claim 19, wherein determining the first over-drive strength factor for the first frame layer based at least in part on the motion information associated with the first frame layer comprises:

determining a match between the motion information associated with the first frame layer and a motion information range in a series of two or more motion information ranges each correlated with an over-drive strength factor; and determining the first over-drive strength factor for the first frame layer as the over-drive strength factor correlated with matching motion information range.

27. The method of claim 19, wherein the display panel is a liquid-crystal display (LCD) panel or an organic light-emitting diode (OLED) panel.

28. A non-transitory processor readable medium having stored thereon processor-executable instructions configured to cause a processor of a wireless device to perform operations comprising:

receiving a draw call for a first frame layer from an application;

performing fragment shading on the first frame layer to generate a first framebuffer object for the first frame layer;

determining motion information associated with the first frame layer;

determining a first over-drive strength factor for the first frame layer based at least in part on the motion information associated with the first frame layer;

determining whether the first over-drive strength factor is associated with computing a content difference; and in response to determining that the first over-drive strength factor is associated with computing a content difference:

performing fragment shading on the first framebuffer object for the first frame layer to generate an over-drive compensated framebuffer object for the first frame layer based at least in part on the first over-drive strength factor; and outputting the over-drive compensated framebuffer object for the first frame layer to a default framebuffer for rendering on a display panel.

* * * * *